United States Patent Office 2,965,589
Patented Dec. 20, 1960

2,965,589

AQUEOUS DISPERSIONS OF ZINC STEARATE AND POLYETHYLENE GLYCOL MONOESTERS

Raymond M. Price, Midland, Mich., assignor to The Dow Chemical Company, Midland, Mich., a corporation of Delaware No Drawing. Filed Oct. 26, 1956, Ser. No. 618,428

6 Claims. (Cl. 260—23)

This invention concerns aqueous dispersions of zinc stearate and certain fatty acid monoesters of polyethylene glycols. It relates more particularly to compositions which are aqueous dispersions of such compounds and suitable for use in applying said compounds uniformly to surfaces of plastic materials, e.g. polystyrene, and pertains to surface lubricated plastic molding materials.

In the manufacture of molded articles of polystyrene or other thermoplastic polymers it is common practice to incorporate small amounts of flow agents or lubricants with the polymer to improve the flow and facilitate the release of molded articles from a mold cavity. Intimately incorporating a flow agent or lubricant throughout the polymer has the disadvantage that substantial amounts of the agent are usually required to effect satisfactory flow of the heat-plastified polymer into all parts of the mold cavity, particularly if a mold of intricate design or shape is employed. The adding of an appreciable quantity of a flow agent sufficient to effect flow of the polymer to all parts of a mold results in a lowering of the mechanical properties, e.g. the heat distortion temperature, of the polymer and is undesirable. The coating of surfaces of granules or particles of the polymer to be molded with a flow agent or lubricant such as sodium stearate, zinc stearate or a polyethylene glycol has the disadvantage that such materials in finely divided, powdered or liquid form cannot readily be uniformly distributed or maintained uniformly distributed over surfaces of the polymer, e.g. surfaces of molding grade polystyrene in granular form. The dry blending of polystyrene granules with sodium stearate or zinc stearate results in a blend of the materials which has a tendency to dust or become non-uniform in composition upon handling and is not satisfactory. The employment of liquid lubricants or flow agents for molding polymer granules by applying such agents to surfaces of the granules presents similar difficulties with regard to uniform distribution and is generally unsatisfactory.

It has now been found that zinc stearate and certain fatty acid monoesters of polyethylene glycols as hereinafter defined can be suspended in water to form stable aqueous dispersions. It has been discovered that such aqueous dispersions of zinc stearate and mono fatty acid esters of polyethylene glycols can be applied to surfaces of plastics, particularly polymers of alkenyl aromatic compounds, e.g. polystyrene, in granular form and dried to obtain a final product comprising the polymer granules having said compounds uniformly and adherently distributed over surfaces of the granules. It has further been found that the final product, e.g. surface treated polymer granules, are non-dusting and substantially free from a tendency to accumulate or hold a static charge such as usually occurs in the handling, tumbling or screening of polymer granules.

The polyethylene glycol monoesters to be employed in preparing the aqueous dispersions can be the monoesters of fatty acids containing from 12 to 18 carbon atoms in the molecule such as lauric acid, oleic acid or stearic acid and a polyethylene glycol having an average molecular weight between 400 and 6000, depending in part upon the fatty acid and the molecular weight of the polyethylene glycol employed. Examples of suitable polyethylene glycol monoesters are monooleates of polyethylene glycols having an average molecular weight between 400 and 6000, monolaurates of polyethylene glycols having an average molecular weight between 400 and 4000 and monostearates of polyethylene glycols having an average molecular weight between 400 and 1500. The fatty acid monoesters are preferably monoesters of lauric, oleic or stearic acids and a polyethylene glycol having an average molecular weight between 400 and 1000. Mixtures of any two or more of the monoesters may also be used.

According to the invention the aqueous dispersions are prepared by mixing from 1 to 10 parts by weight of zinc stearate and from 1 to 10 parts of one or more of the polyethylene glycol monoesters with water that is free or substantially free from dissolved solids, preferably distilled or deionized water, in amount such as to form an aqueous dispersion containing the zinc stearate and the monoester in a total amount corresponding to from 2 to 20, preferably from 2 to 10, percent by weight of the mixture. The resulting mixture is heated at temperatures between 50° and 100° C., preferably from 60° to 95° C. and agitated to effect an intimate dispersion of the ingredients in the water and form a stable aqueous suspension. Thereafter, the dispersion can be cooled or allowed to cool to room temperature or thereabout.

It is important that the mixture of the ingredients and water be heated at elevated temperatures of at least 50° C. preferably between 60° and 95° C., and agitated in order to obtain dispersions having the ingredients uniformly distributed throughout. It may be mentioned that in some instances the dispersions have a tendency to separate upon cooling to ordinary temperatures, but they can readily be converted to a uniform dispersion by agitating, e.g. shaking or stirring, or by heating the same at temperatures between 50° and 100° C. and agitating.

The aqueous dispersions are useful in applying the ingredients to surfaces of plastic articles. They are particularly useful compositions for applying said ingredients to surfaces of particles of thermoplastic vinyl aromatic polymers, e.g. polystyrene, in powdered or granular form, to facilitate the molding of plastic articles therefrom by usual compression or injection molding operations.

For such purpose, the aqueous dispersion is employed in amounts corresponding to from 300 to 4000 parts by weight of the sum of the zinc stearate and the polyethylene glycol monoester per million parts by weight of the polymer.

The aqueous dispersion when applied to surfaces of plastic materials and dried in usual ways such as by heating in an oven, under radiant heat or in air, form coatings in which the ingredients are uniformly distributed and tenaciously bonded to surfaces of the plastic. Such coated granules of the plastic are free-flowing non-dusting particles and have little or no tendency to acquire or hold a static charge. The coated plastic particles also have a tendency to have a greater bulk density when permitted to fall in free flow into a vessel or chamber. This is of advantage in injection molding processes since it permits a somewhat greater charge of the granules to be fed to the cylinder of an injection molding machine than is otherwise possible. The coated plastic granules can be molded at lower molding temperatures than uncoated particles and form molded articles which have heat distortion temperatures substantially the same as articles prepared from uncoated polymers under otherwise similar conditions.

The following examples illustrate ways in which the principle of the invention has been applied, but are not to be construed as limiting its scope.

EXAMPLE 1

(A) A mixture of 5 grams of the stearic acid monoester of polyethylene glycol of average molecular weight of 400, i.e. polyethylene glycol monostearate, 5 grams of zinc stearate and 400 grams of deionized water was heated at temperatures between 70° and 80° C. and stirred for a period of 5 minutes. A stable dispersion was obtained. Upon cooling to room temperature the dispersion had a slight tendency to separate, but was readily converted into a uniform dispersion by shaking or stirring.

(B) A charge of 1500 grams of polystyrene having a viscosity characteristic of 30 centipoises (10 weight percent solution of the polystyrene in toluene) at 25° C. and in the form of small particles of sizes between 4 and 30 mesh per inch as determined by U.S. Standard screens was mixed with the aqueous dispersion prepared in part A above. The mixture was allowed to stand for 5 minutes while draining the excess dispersion from the granules. About 60 grams of the dispersion remained on the granules. The treated granules were dried in air at room temperature for a period of about 16 hours, then in an oven at a temperature of 60° C. and an absolute pressure of about 500 millimeters for a period of one hour. The zinc stearate and polyethylene glycol monostearate were uniformly and adherently distributed over surfaces of the polystyrene granules. A one liter wide mouth glass bottle was filled half full of the treated granules then closed and rolled for 10 minutes. No dusting of the added agents from the polystyrene granules was observed.

(C) A portion of the treated granules was tested to determine a static characteristic for the granules. The procedure for determining the static characteristic was to spread 50 grams of the granules on a clean glass plate in a layer ¼ inch deep. A molded bar of polystyrene having the dimensions ⅛ x 1 x 6 inches long was rubbed with a woolen cloth to develop a static charge. The bar was passed over the layer of granules at a distance of about ⅛ inch therefrom. The fine particles which were attracted to, and collected on, the bar were shaken therefrom into a tared receiver. The operations were repeated without recharging the bar until the static charge on the bar was dissipated. The weight of the fine particles was determined. The weight of the particles collected with the charged bar represents a static characteristic for the granules. The weight of the fine particles collected in the above test was 0.1 gram. In contrast, polystyrene granules not treated with the zinc stearate and polyethylene glycol monostearate dispersion showed a static characteristic corresponding to 1.1 grams of fine particles when tested in similar manner.

(D) A charge of 100 grams of the treated granules was subjected to a screening test to determine the ease of separating the particles, employing a series of Nos. 8, 10, 16, 20 and 28 mesh per inch U.S. Standard screens. The procedure was to pour the granules on the top No. 8 screen and shake the screens for 40 seconds, then separate and weigh the portions of the granules passing through each screen. For purpose of comparison, polystyrene granules not treated with the zinc stearate and polyethylene glycol monostearate dispersions were tested in similar manner. Table I gives the results obtained.

*Table I*

| Run No. | Surface Additive | Polymer through Screen Size No. | | | | |
|---|---|---|---|---|---|---|
| | | 8 gm. | 10 gm. | 16 gm. | 20 gm. | 28 gm. |
| 1 | None | 39.8 | 18.2 | 5.7 | 4.4 | 3.0 |
| 2 | Zinc Stearate, polyethylene glycol monostearate | 42.8 | 19.7 | 7.6 | 6.2 | 4.4 |

(E) A bulk density value for the treated polystyrene granules was determined by filling a tared 100 ml. glass graduate with the granules by allowing the granules to fall from a funnel opening of ½ inch diameter placed one inch above the graduate under free flow and without shaking, weighing the granules and calculating the bulk density. The treated granules had a bulk density of 0.648. In contrast, polystyrene granules not treated with the surface lubricants had a bulk density of only 0.604.

(F) Portions of the treated polystyrene granules were injection molded to form test bars of ⅛ x ½ inch cross section by 6½ inches long. The test pieces were molded on a standard plastics injection molding machine having a tunnel capacity such that the polymeric material was heated therein for a period of 200 seconds when the machine was operated on a 45 seconds cycle for molding a test bar. The procedure for molding a test bar to determine a molding temperature characteristic for the polymeric material was to maintain the molding pressure applied to the plastic at a constant value, e.g. 5000, 9000 or 13,000 pounds per square inch, and change the temperature at which the polymer was heated until the flow rate of the polymer under the applied molding pressure was just sufficient to fill the mold in a period of 7 seconds. The temperature was observed and is herein designated as the "flow temperature" for the polymer. The lower the flow temperature the greater is the moldability of the polymer. Other portions of the composition were injection molded at a pressure of 10,000 pounds per square inch and at a temperature of 25° F. above the flow temperature to form test pieces. These test pieces were used to determined the tensile strength and percent elongation values for the polymer employing procedures similar to those described in ASTM D638–49T. The heat distortion temperature was determined by procedure similar to that described by Heirholzer and Boyer, see ASTM Bull. No. 134 of May 1945, employing test bars of ⅛ x ½ inch cross section by 2½ inches long. For purpose of comparison, polystyrene granules not treated with the zinc stearate and polyethylene glycol monostearate dispersion were molded and tested under similar conditions. Table II identifies the runs and gives the results obtained.

*Table II*

| Run No. | Added Agent | Flow Temperature at pressure of | | | Tensile Strength, lbs./sq. in. | Elongation, per cent | Heat Distortion Temp. °C. |
|---|---|---|---|---|---|---|---|
| | | 5,000 p.s.i., °F. | 9,000 p.s.i., °F. | 13,000 p.s.i., °F. | | | |
| 1 | None | 555 | 470 | 435 | 7,740 | 2.7 | 90 |
| 2 | Zinc Stearate and Polyethylene glycol monostearate. | 535 | 440 | 405 | 8,150 | 3.5 | 88 |

EXAMPLE 2

A charge of one part by weight of the stearic acid monoester of polyethylene glycol having an average molecular weight of 1000 was added to 98 parts of deionized water. The mixture was stirred and heated to temperatures between 70° and 80° C. Thereafter, one part by weight of zinc stearate was added. The resulting mixture was stirred vigorously for a period of 5 minutes. A stable emulsion was obtained. Upon cooling to room temperature, partial separation of the emulsion occurred. It was readily converted to a uniform dispersion by shaking. Polystyrene granules which were treated with the emulsion and allowed to dry in air at room temperature had a uniform and adherent layer of the added ingredients on surfaces of the granules. The treated granules were nondusting and had little tendency to acquire a static charge.

EXAMPLE 3

In each of a series of experiments, one part by weight of the oleic acid monoester of polyethylene glycol having an average molecular weight as stated in the following table was added to 98 parts of deionized water. The mixture was heated to 70° C., and stirred vigorously while adding one part by weight of zinc stearate. Table III identifies the composition by giving the average molecular weight of the polyethylene glycol from which the monooleic acid ester was prepared. In the table the symbol E– followed by a number indicates the average molecular weight of the polyethylene glycol used in making the polyethylene glycol monoester.

*Table III*

| Run No. | Monooleic Acid Ester of Polyethylene Glycol | | Zinc Stearate, Percent | Dispersion |
|---|---|---|---|---|
| | Kind | Percent | | |
| 1 | E-1,000 | 1 | 1 | moderately stable. |
| 2 | E-2,000 | 1 | 1 | good stability. |
| 3 | E-4,000 | 1 | 1 | stable. |
| 4 | E-6,000 | 1 | 1 | Do. |

EXAMPLE 4

A charge of 5 grams of lauric acid monoester of polyethylene glycol having an average molecular weight of 1500 was added to 400 ml. of distilled water. The mixture was stirred and heated to temperatures between 70° and 80° C. and 5 grams of zinc stearate was added. A stable dispersion was obtained. Upon cooling to room temperature and standing for a period of 0.5 hour, slight settling occurred. The ingredients were easily redispersed upon shaking.

Polystyrene granules coated with the aqueous dispersion and dried had an adherent coating of the ingredients uniformly distributed over surfaces of the granules. The surface treated granules were non-dusting.

EXAMPLE 5

A charge of 16 grams of stearic acid monoester of polyethylene glycol having a molecular weight of 400, was added to 400 ml. of distilled water. The mixture was heated at temperatures between 70° and 80° C. and 16 grams of zinc stearate added while vigorously stirring the resulting mixture. A stable emulsion was obtained.

A charge of 1500 grams of polystyrene similar to that employed in part B of Example 1 was treated with an amount of the aqueous dispersion corresponding to about 1200 parts by weight of the sum of the zinc stearate and the polyethylene glycol monostearate per million parts of the polystyrene. The treated granules were dried. The treated polystyrene granules were non-dusting. Portions of the treated polystyrene were injection molded to form test pieces and were tested to determine a flow temperature for the composition employing procedures similar to those employed in part F of Example 1. Table IV gives the results obtained.

*Table IV*

| Run No. | Added Agent | Flow Temperature at pressure of | |
|---|---|---|---|
| | | 5,000 p.s.i., °F. | 13,000 p.s.i., °F. |
| 1 | None | 500 | 390 |
| 2 | Zinc Stearate and Polyethylene glycol monostearate. | 475 | 365 |

EXAMPLE 6

A charge of 4 grams of stearic acid monoester of polyethylene glycol having a molecular weight of 400 was added to 400 ml. of distilled water. The mixture was stirred and heated to temperatures between 70° and 80° C. Thirty-two grams of zinc stearate was added with stirring. The resulting mixture was a stable dispersion. Upon cooling partial separation of the dispersion occurred. It was easily redispersed upon shaking. Polystyrene granules treated with the aqueous dispersion and dried were found to have an adherent coating of the ingredients uniformly distributed on surfaces of the granules. The granules contained about 3900 parts by weight of the combined zinc stearate and polyethylene glycol stearate per million parts by weight of the polystyrene. The treated granules were molded and tested to determine a flow temperature for the composition employing procedures similar to those employed in part F of Example 1. The treated polystyrene granules had a flow temperature of 475° F. at a molding pressure of 5000 p.s.i. gauge pressure. In contrast, polystyrene granules not treated with the aqueous dispersion had a molding temperature of 500° F. at a molding pressure of 5000 p.s.i.

I claim:

1. A method of forming an adherent non-dusting lubricant coating on surfaces of plastics which comprises contacting polystyrene with a dispersion of zinc stearate in water containing at least one monoester of a polyethylene glycol selected from the group consisting of monostearates of polyethylene glycols having a molecular weight between 400 and 1500, monooleates of polyethylene glycols having a molecular weight between 400 and 6000 and monolaurates of polyethylene glycols having a molecular weight between 400 and 4000, said dispersion containing the ingredients in proportions corresponding to from 1 to 10 parts by weight of the zinc stearate and from 1 to 10 parts of the monoester and in a concentration of from 2 to 20 percent by weight of the sum of the weights of the zinc stearate and the monoester, based on the total weight of the dispersion, said dispersion being employed in amounts corresponding to from 300 to 4,000 parts by weight of the sum of the weights of the zinc stearate and the polyethylene glycol monoester per million parts by weight of the polystyrene and drying the polystyrene.

2. A method as claimed in claim 1, wherein the monoester is a monostearate of polyethylene glycol having a molecular weight between 400 and 1500.

3. A method as claimed in claim 1, wherein the monoester is a monooleate of polyethylene glycol having a molecular weight between 400 and 6000.

4. A method as claimed in claim 1, wherein the monoester is a monolaurate of polyethylene glycol having a molecular weight between 400 and 4000.

5. A method as claimed in claim 1, wherein the monoester is stearic acid monoester of polyethylene glycol having an average molecular weight of 400.

6. A composition comprising polystyrene having on the surface thereof a uniform adherent non-dusting lubricant comprising a mixture of zinc stearate and at least one monoester of a polyethylene glycol selected from the group consisting of monostearates of polyethylene glycols having a molecular weight between 400 and 1500, monooleates of polyethylene glycols having a molecular weight between 400 and 6000 and monolaurates of polyethylene glycols having a molecular weight between 400 and 4000, in proportions corresponding to from 1 to 10 parts of the zinc stearate and from 1 to 10 parts of the monoester, said lubricant being present in amounts of from 300 to 4000 parts by weight per million parts of the polystyrene.

References Cited in the file of this patent

UNITED STATES PATENTS

| | | |
|---|---|---|
| 2,245,040 | Marks | June 10, 1941 |
| 2,425,828 | Retzsch et al. | Aug. 18, 1947 |
| 2,578,586 | Orozco et al. | Dec. 11, 1951 |
| 2,660,567 | Grunder et al. | Nov. 24, 1953 |
| 2,660,568 | Grunder et al. | Nov. 24, 1953 |
| 2,666,685 | Hommel et al. | Jan. 19, 1954 |
| 2,706,163 | Fitko | Apr. 12, 1955 |
| 2,770,859 | Henry | Nov. 20, 1956 |
| 2,779,744 | Groff et al. | Jan. 29, 1957 |
| 2,871,208 | Christenson et al. | Jan. 27, 1959 |

OTHER REFERENCES

Zimmerman et al.: Handbook of Material Trade Names, 1953 edition, page 49.

Emulsions and Detergents, Carbide and Carbon Chemicals Corp., 8th edition (1949), page 14.

Moilliet & Collie: Surface Activity, page 342–345, E. & F. N. Spon. Ltd., London (1951).

Sisley et al.: Encyclopedia of Surface Active Agents, page 220, Chem. Pub. Co. (1952).